(12) United States Patent
Yamaguchi

(10) Patent No.: US 10,753,305 B2
(45) Date of Patent: *Aug. 25, 2020

(54) COMBUSTION CONTROL METHOD IN VEHICLE ENGINE AND ENGINE SYSTEM FOR VEHICLE

(71) Applicant: NGK INSULATORS, LTD., Nagoya-shi, Aichi (JP)

(72) Inventor: Takafumi Yamaguchi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,813

(22) Filed: Jan. 7, 2019

(65) Prior Publication Data

US 2019/0218992 A1 Jul. 18, 2019

(30) Foreign Application Priority Data

Jan. 12, 2018 (JP) .................................. 2018-003634

(51) Int. Cl.
*F02D 41/14* (2006.01)
*F02D 41/40* (2006.01)
(Continued)

(52) U.S. Cl.
CPC ......... *F02D 41/401* (2013.01); *F02D 35/023* (2013.01); *F02D 41/1441* (2013.01); *F02D 41/1446* (2013.01); *F02D 41/1461* (2013.01); *F02D 41/1475* (2013.01); *F02D 41/402* (2013.01); *F02M 26/05* (2016.02);
(Continued)

(58) Field of Classification Search
CPC .. F02D 41/401; F02D 41/402; F02D 41/1475; F02D 41/1461; F02D 41/1446; F02D 41/1441; F02D 29/02; F02D 35/023; F02D 2200/50; F02D 2200/0802; F02D 2200/06; F02M 26/05; F02M 26/15; F02M 26/06
USPC ............. 123/435, 672, 697, 406.41, 406.44; 701/103–105, 109, 111; 73/114.71, 73/114.72, 114.73; 60/276, 285
See application file for complete search history.

(56) References Cited

U.S. PATENT DOCUMENTS

| 2013/0133632 A1 | 5/2013 | Sano et al. |
| 2019/0218985 A1* | 7/2019 | Yamaguchi ......... F02D 41/1475 |
| 2019/0218986 A1* | 7/2019 | Yamaguchi ......... F02D 41/1441 |

FOREIGN PATENT DOCUMENTS

| JP | 2009-287410 A | 12/2009 |
| WO | 2011/117973 A1 | 9/2011 |

* cited by examiner

*Primary Examiner* — Hai H Huynh
(74) *Attorney, Agent, or Firm* — Mattingly & Malur, PC

(57) ABSTRACT

A combustion control method in an engine of a vehicle wherein an exhaust path includes a catalyst and a NOx sensor provided on an upstream side of the catalyst, the method includes the following steps. A step of determining whether a NOx concentration in an exhaust gas falls within a predetermined reference range; a step of estimating a heat generation rate profile indicating crank angle dependency of a heat generation rate in the engine when the NOx concentration is determined out of the reference range; and a step of comparing a value of an index characterizing the estimated heat generation rate profile with a value of an index in an ideal heat generation rate profile specified from a driving condition of the vehicle and controlling a combustion condition in the engine based on a result.

20 Claims, 7 Drawing Sheets

(51) Int. Cl.
    *F02M 26/06*     (2016.01)
    *F02M 26/15*     (2016.01)
    *F02D 35/02*     (2006.01)
    *F02M 26/05*     (2016.01)
    *F02D 29/02*     (2006.01)

(52) U.S. Cl.
    CPC ............ *F02M 26/06* (2016.02); *F02M 26/15* (2016.02); *F02D 29/02* (2013.01); *F02D 2200/06* (2013.01); *F02D 2200/0802* (2013.01); *F02D 2200/50* (2013.01)

COMBUSTION CONTROL METHOD IN VEHICLE ENGINE AND ENGINE SYSTEM FOR VEHICLE

CROSS-REFERENCE TO RELATED APPLICATION

The present application claims priority from Japanese application JP 2018-003634, filed on Jan. 12, 2018, the contents of which is hereby incorporated by reference into this application.

BACKGROUND OF THE INVENTION

Field of the Invention

The present invention relates to combustion control in a vehicle engine, and more particularly to control based on a NOx concentration in exhaust gas.

Description of the Background Art

In recent years, automobiles equipped with cylinder pressure sensors have become widespread. In such an automobile, the combustion mode of an engine rotating at high speed can be grasped for each crank angle by measuring the pressure inside a piston with a cylinder pressure sensor attached to the upper part of the piston of the engine is known (see, WO2011/117973). The combustion mode can be grasped on board with the cylinder pressure sensor; therefore it is deemed to be one of the quickest and the high responsive sensor for any sensor involved particularly in engine control among the known sensors. Technically, it is also possible to grasp the cylinder temperature by assuming the momentary change of the output value from the cylinder pressure sensor as polytropic change.

Meanwhile, NOx from automobiles, which has been regarded as an air pollutant in recent years, is usually generated by combusting nitrogen as inert gas, in a high temperature field. Also, there is a relationship between the oxygen concentration in the engine cylinder (which can be calculated from the intake oxygen concentration), the cylinder temperature, and NOx generation. Therefore, by holding information indicating the relationship in advance in the engine ECU as a map or function, estimation of an amount of NOx discharged from the engine can be performed on board and in real time based on temperature information obtaining from an output from the cylinder pressure sensor, intake air volume, and a cylinder oxygen concentration (see, Japanese Patent Application Laid-Open No. 2009-287410). In such a case, the intake air volume and the cylinder oxygen concentration are calculated based on a cylinder pressure or an output of an air flow sensor, an opening area of an exhaust gas recirculation (EGR) valve constituting an EGR device in the engine, an output from a pressure sensor equipped with an EGR system, and an output value from an oxygen sensor equipped with an inlet system or an exhaust system.

The combustion control of the engine based on the output value from the cylinder pressure sensor has the following problems.

First of all, the cylinder pressure sensor is remarkably highly responsive, however, a dedicated ECU for high speed calculation is also required in addition to being expensive per se. In addition, depending on a type of vehicle and destination of the automobile, a plurality of cylinder pressure sensors could be required in some cases. Therefore, it is disadvantageous in terms of cost and securing of mounting space therein.

Further, the cylinder pressure sensor is highly responsive, therefore, the amount of data output is also large, however, the calculation speed of the engine control ECU to which the dedicated ECU is connected cannot catch up with the output. Therefore, when the cylinder pressure sensor is actually used, many of the output data are thinned out, or some of the output data are supplied to calculation of engine control logic. Therefore, it is also disadvantageous from the viewpoint of cost effectiveness.

Further, the cylinder pressure may instantaneously swing to the high pressure side or the low pressure side because of the reaction force originating from steps on the road surface, which transmits from tires through a drive train and acts in the direction opposite to the engine rotation direction. Therefore, when the engine control is operated based on the output value of the cylinder pressure sensor, the calculation in the engine control ECU is possibly affected by pressure fluctuation attributed to a factor other than the combustion in the engine. Particularly, when data processing such as thinning out the output data from the cylinder pressure sensor is adopted, it is likely to be susceptible to such influence.

The inventors of the present invention has built a hypothesis in which when the amount of NOx discharged from the engine is equivalent, the combustion history in the engine cylinder should be equivalent through the assiduous study and achieved to conceive a new technique of combustion control of engine based on the NOx amount in the exhaust gas instead of combustion control based on the output value from the cylinder pressure sensor.

SUMMARY

The present invention relates to combustion control in a vehicle engine, and more particularly to control based on a NOx concentration in exhaust gas.

According to the present invention, a combustion control method in an engine of a vehicle wherein an exhaust path for an exhaust gas discharged from the engine includes a catalyst and a NOx sensor provided on an upstream side of the catalyst, includes the steps of a) specifying a NOx concentration in the exhaust gas based on an output value from the NOx sensor and determining whether the NOx concentration falls within a predetermined reference range, b) estimating a heat generation rate profile indicating crank angle dependency of a heat generation rate in the engine when the NOx concentration is determined out of the reference range in the step a); and c) comparing a value of an index characterizing the heat generation rate profile estimated in the step b) with a value of an index in an ideal heat generation rate profile specified from a driving condition of the vehicle on which the engine is mounted and controlling a combustion condition in the engine based on a result thereof.

Therefore, the combustion control of the engine is suitably performed without providing the cylinder pressure sensor, with substantially the same controllability as the controllability in the combustion control using a cylinder pressure sensor. In addition, the combustion control is not only advantageous in cost aspect but also the combustion control with high robustness against physical disturbance is executed as compared with the case where the cylinder pressure sensor is used.

Accordingly, the object of the present invention is to provide a novel combustion control method for a vehicle engine.

These and other objects, features, aspects and advantages of the present invention will become more apparent from the following detailed description of the present invention when taken in conjunction with the accompanying drawings.

DESCRIPTION OF THE PREFERRED EMBODIMENTS

<Fundamental Conception of Equal-NOx Combustion Control>

First, the fundamental conception of equal-NOx combustion control (also referred to as equal-NOx control), which is a combustion control method for a vehicle engine according to the present embodiment, will be described. The equal-NOx combustion control is a control method for maintaining the combustion state in the engine in a steady state. Briefly, the NOx concentration in the exhaust gas discharged from the internal combustion engine is measured, and the operation of the engine is controlled such that the NOx concentration is kept substantially constant, whereby the state of the combustion in the engine is maintained to be the steady state.

Figure 1:
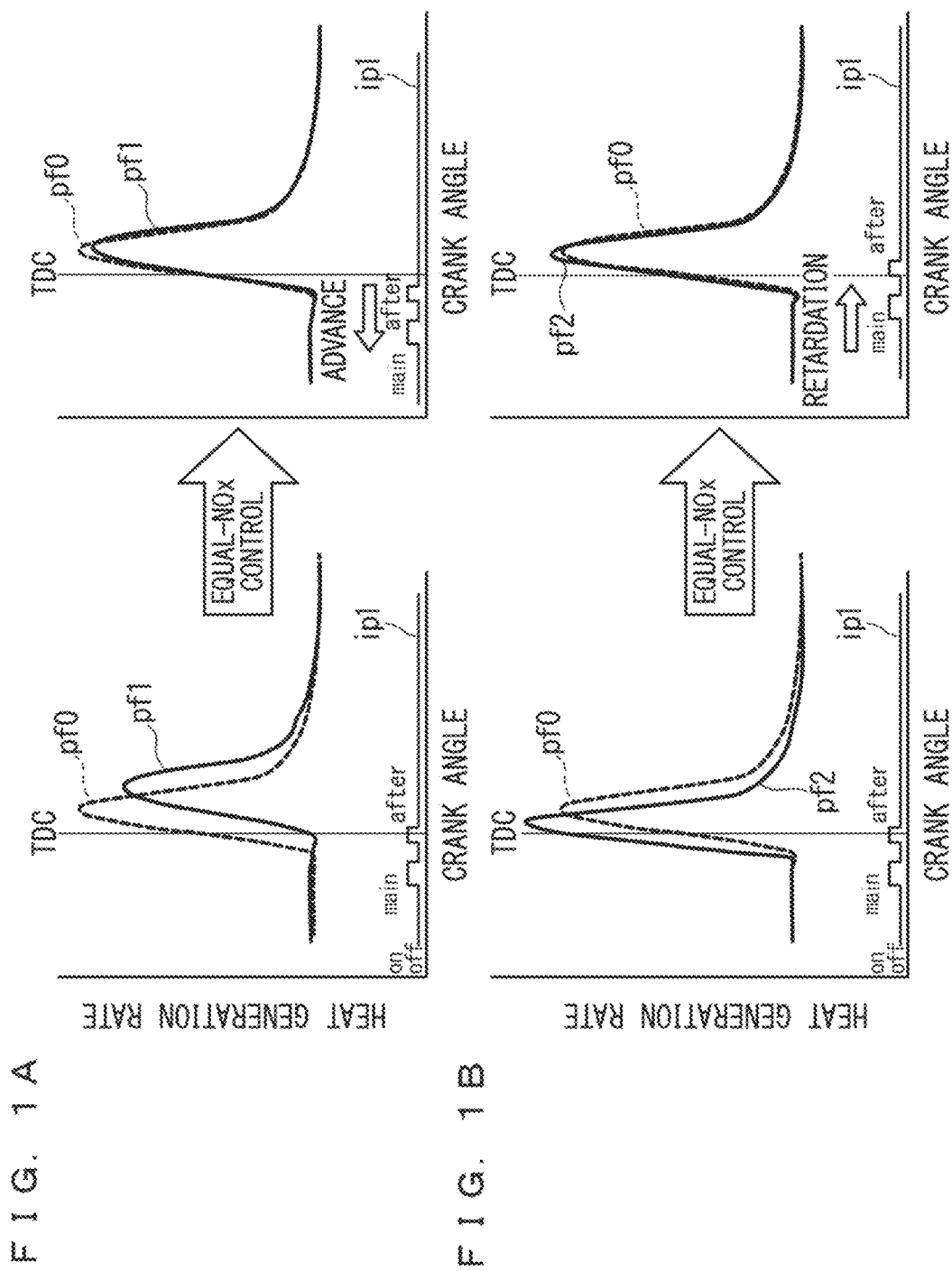
FIGS. 1A and 1B are graphs illustrating fundamental conceptions of equal-NOx combustion control.

FIGS. 1A and 1B are graphs illustrating fundamental conceptions of the equal-NOx combustion control performed in the present embodiment. Specifically, in FIG. 1A and FIG. 1B, crank angle (corresponding to time) dependency of the heat generation rate in the engine (heat generation rate profile) and fuel injection pulses for defining fuel injection timing before and after the equal-NOx combustion control in the case of partial premix combustion as an example are illustrated together.

Indicated by a broken line in FIGS. 1A and 1B is an ideal heat generation rate profile (ideal profile) pf0 corresponding to a certain fuel injection pulse ip1. As the ideal profile pf0, it is preferable to have a waveform such that the peak is located on the retard angle side by about 5° CA from the top dead center TDC of the piston. Although, the best fuel efficiency is achieved when the combustion peak coincides with the TDC, in that case, the noise is considerably increased; therefore, it is generally considered that the slightly retarded angle is preferable.

However, when the fuel injection pulse ip1 is actually given, the heat generation rate changes along the heat generation rate profile pf1 as indicated by the solid line in FIG. 1A, which is later in time than the ideal profile pf0, or along the heat generation rate profile pf2 as indicated by the solid line in FIG. 1B, which is earlier in time than the ideal profile pf0 in some cases. The former corresponds to a case where the ignition timing is later than the ideal for some reason and the latter, similarly, corresponds to the case where the ignition timing is earlier than the ideal.

In the equal-NOx combustion control performed in the present embodiment, such a deviation of the ignition timing from the ideal state is detected based on a change in the concentration of NOx discharged from the engine as a trigger. When it is determined that the ignition timing is behind the ignition timing in the ideal state as illustrated in FIG. 1A, the ignition timing is advanced, and as illustrated in FIG. 1B, when it is determined that the ignition timing is earlier than the ignition timing in the ideal state, the ignition timing is retarded. As a result, as illustrated on the right side in FIGS. 1A and 1B, the heat generation rate profile pf1 or pf2 substantially coincides with the ideal profile pf0, that is, the combustion state of the engine close to the ideal is realized.

Meanwhile, in some cases, despite that the ignition timing is equal to the ideal state, it is determined that the cylinder pressure (in-cylinder pressure) in the engine is excessive or too small compared to the reference value. In such a case, by adjusting the boost pressure by the turbo (turbocharger) or the recirculation amount (EGR amount) of the exhaust at the EGR, a heat generation rate profile close to the ideal profile pf0 is obtained.

Such equal-NOx combustion control is based on the assumption that the hypothesis that a cylinder combustion history in the engine is equivalent if the NOx concentration in the exhaust gas is equivalent.

It should be noted that the combustion waveforms exemplified in FIGS. 1A and 1B exemplify a premixed combustion mode that generates heat later than the main injection timing. However, the above description holds true in the case of diffusion combustion, which is a standard combustion mode of a diesel engine in which combustion starts during main injection.

<Configuration Example of the Engine System>

Figure 2:
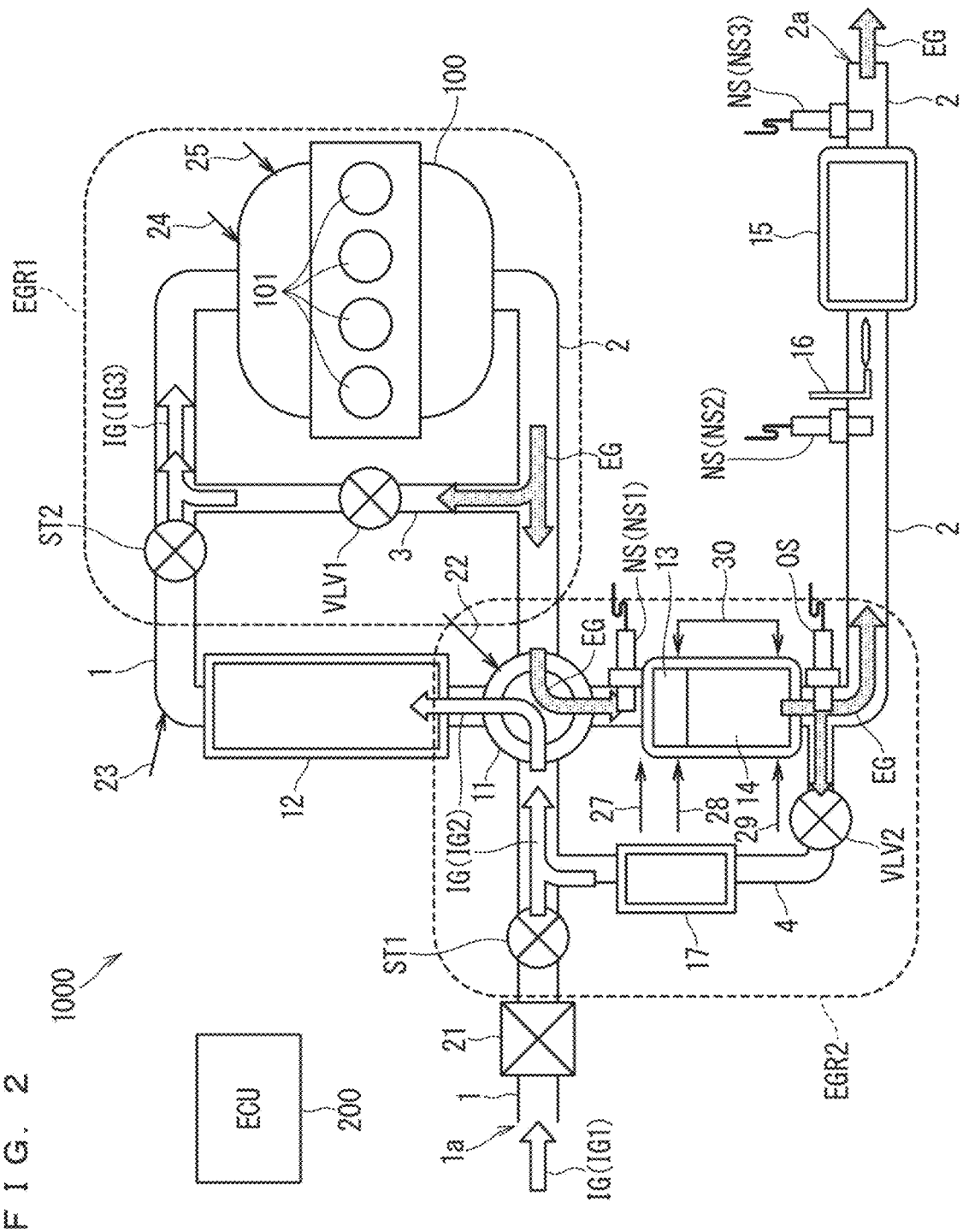
FIG. 2 is a diagram illustrating a structure for intake and exhaust of an engine system 1000.

FIG. 2 is a diagram illustrating a structure for intake and exhaust of an engine system 1000 for a vehicle which is one mode of a control target of the equal-NOx combustion control according to the present embodiment.

The engine system 1000 for a vehicle illustrated in FIG. 2 is a four-cylinder diesel engine system including four cylinders (more specifically, combustion chambers) 101 in an engine main body 100 mounted on a vehicle (not shown). In the present specification, the engine system 1000 for a vehicle and the engine main body 100 are sometimes simply referred to as engines without distinction. As the engine main body 100, a known configuration (so-called 4 cycle engine configuration) is used. Therefore, the detailed illustration and description of the components provided in the engine main body 100 such as a piston, a crankshaft, an intake valve, an exhaust valve, a fuel injection device, and a fuel injector will be omitted. The operation of each part of the engine system 1000 for a vehicle is controlled by execution of a predetermined driving control program in an electronic control unit (ECU) 200 storing thereof in advance.

In the engine system 1000, briefly, intake gas (air) IG taken from an intake port 1a and reaching the engine main body 100 via an intake path 1 is used for combustion. On the other hand, the exhaust gas EG from the engine main body 100 is discharged outside through an exhaust path 2 through an exhaust port 2a.

A variable capacity type turbo (VN turbo) 11, which is a type of turbocharger and controls the supply pressure of the intake gas IG by using the exhaust gas EG from the exhaust path 2, is provided in the respective intake path 1 and exhaust path 2. A water-cooled intercooler 12 is provided on the downstream side of the VN turbo 11 in the intake path 1.

On the other hand, on the downstream side of the VN turbo 11 in the exhaust path 2, an occlusion-type NOx reduction catalyst (LNT) 13 for occluding NOx in the exhaust gas EG and a diesel particulate removal device (DPF) 14 for removing particulate matter (PM) in the exhaust gas EG are provided in this order, and furthermore, on the downstream side thereof, a selective catalytic reduction denitrification device (SCR) 15 for decomposing NOx by urea is provided together with a urea supply source 16 for supplying urea to the SCR 15.

A branch path 3 branches off from the exhaust path 2 between the engine main body 100 and the VN turbo 11, and is connected to the intake path 1 on the downstream side of the intercooler 12. Similarly, a branch path 4 branches off from the exhaust path 2 between the DPF 14 and the SCR 15, and is connected to the intake path 1 on the upstream side of the VN turbo 11. An EGR cooler 17 is provided in the middle of the branch path 4.

The branch paths 3 and 4 allow part of the exhaust gas EG from the engine to be mixed into the intake gas IG. That is, the part of the exhaust gas EG is circulated (recirculated) without being discarded and sucked again. In FIG. 2, the gas supplied to the engine main body 100 is collectively referred to as intake gas IG which is categorized into the following manner that intake gas IG taken in from the intake port 1a is particularly referred to as intake gas IG1, and the gas in which the intake gas IG1 is mixed with the exhaust gas EG passing through the branch path 4 is particularly referred to as intake gas IG2, and the gas in which the intake gas IG2 is mixed with the exhaust gas EG passing through the branch path 3 is particularly referred to as intake gas IG3.

In the intake path 1, a throttle ST1 is provided on the upstream side of a junction with the branch path 4, and the throttle ST2 is provided on the upstream side of a junction with the branch path 3. Meanwhile, a valve VLV1 is provided in the middle of the branch path 3, and a valve VLV2 is provided in the middle of the branch path 4. The supply ratio of the exhaust gas EG to the intake gas IG is controlled by the throttle ST1, ST2 and the valves VLV1, VLV2. A configuration for controlling the supply amount of the exhaust gas EG in the intake gas IG3 by controlling the opening and closing of the valve VLV1 is referred to as a high pressure exhaust circulation device EGR1 and a configuration for controlling the supply amount of the exhaust gas EG in the intake gas IG2 by controlling the opening and closing of the valve VLV2 is referred to as a low pressure exhaust circulation device EGR2.

Further, in the engine system 1000, various sensors are provided in various places. Specifically, an airflow sensor 21 for detecting the flow rate of the intake gas IG is provided upstream of the throttle ST1 in the intake path 1, and the VN turbo 11 is provided with a rotation speed sensor 22 for detecting the rotation speed of the turbine. Also, a humidity sensor 23 is provided on the downstream side of the intercooler 12 in the intake path 1. Further, an intake air pressure sensor 24 and an intake air temperature sensor 25 are provided in the engine main body 100.

On the other hand, in the exhaust path 2, the NOx sensors NS (NS1, NS2, NS3) are provided, specifically, each sensor is provided near the upstream side of the LNT 13, near the upstream side of the SCR 15 (of the urea supply source 16) and near the downstream side of the SCR 15. In addition, an oxygen sensor OS is provided near the downstream side of the DPF 14. Temperature sensors 27, 28, and 29 are provided near the upstream side of LNT 13, near the downstream side of LNT 13 (between LNT 13 and DPF 14), and near the downstream side of DPF 14, respectively. In addition, an exhaust pressure sensor (differential pressure sensor) 30 for detecting the pressure difference between the upstream side of the LNT 13 and the downstream side of the DPF 14 is also provided.

Detection signals of these sensors are appropriately used for operation control of the engine system 1000 by the ECU 200 including the equal-NOx combustion control.

<Details of Equal-NOx Combustion Control>

Figure 3:
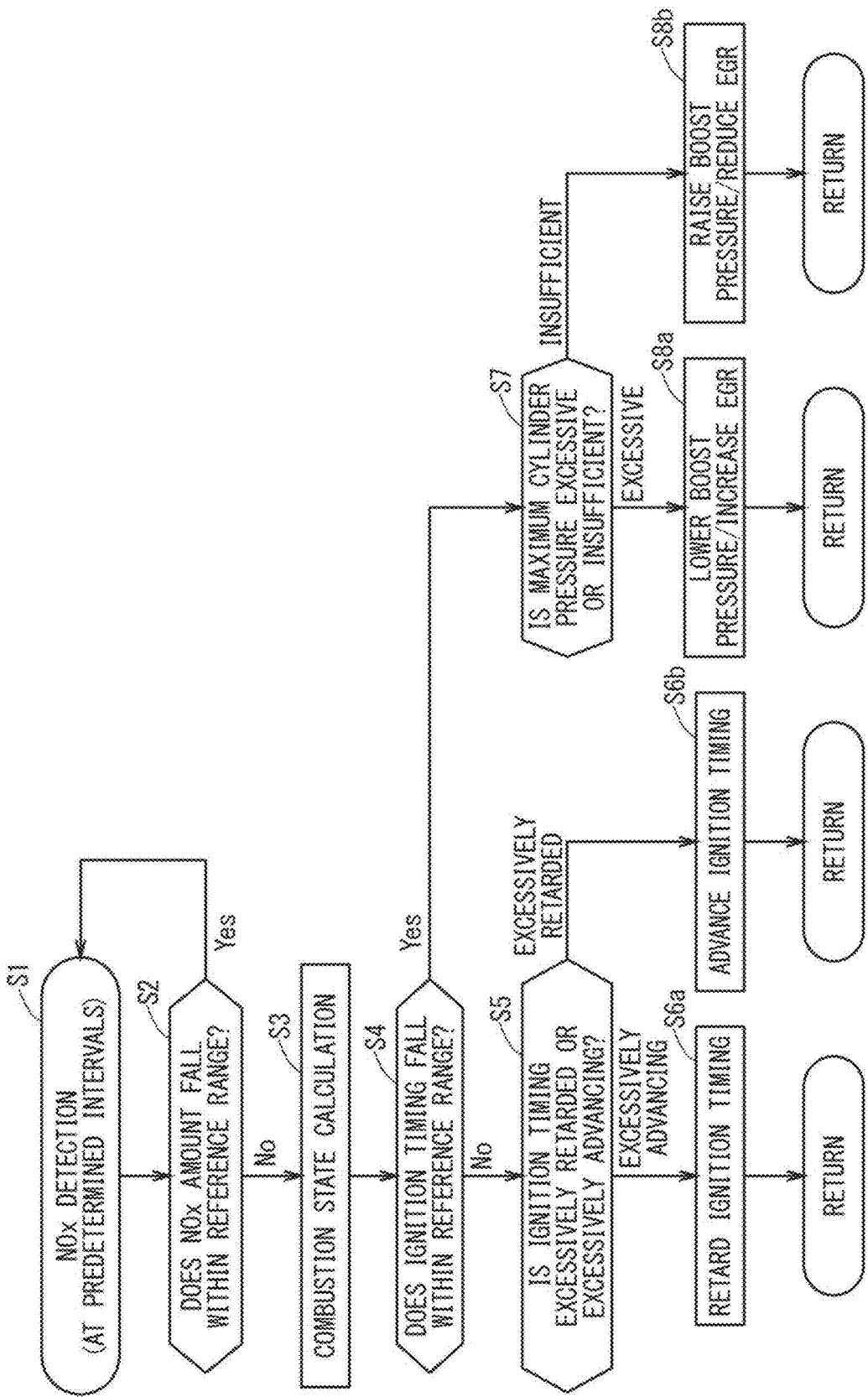
FIG. 3 is a flowchart illustrating specific processing procedure of the equal-NOx combustion control.
Figure 4:
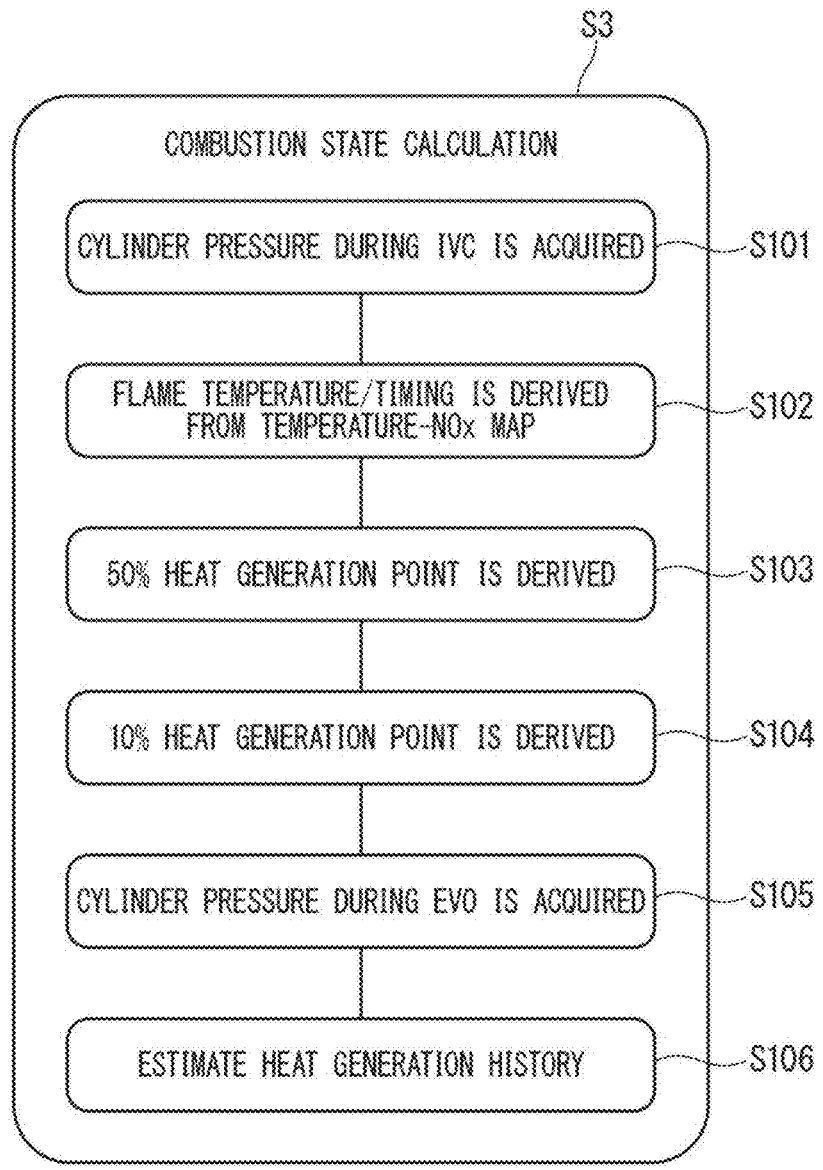
FIG. 4 is a flowchart illustrating a procedure of a combustion state calculation performed in the equal-NOx combustion control.
Figure 5:
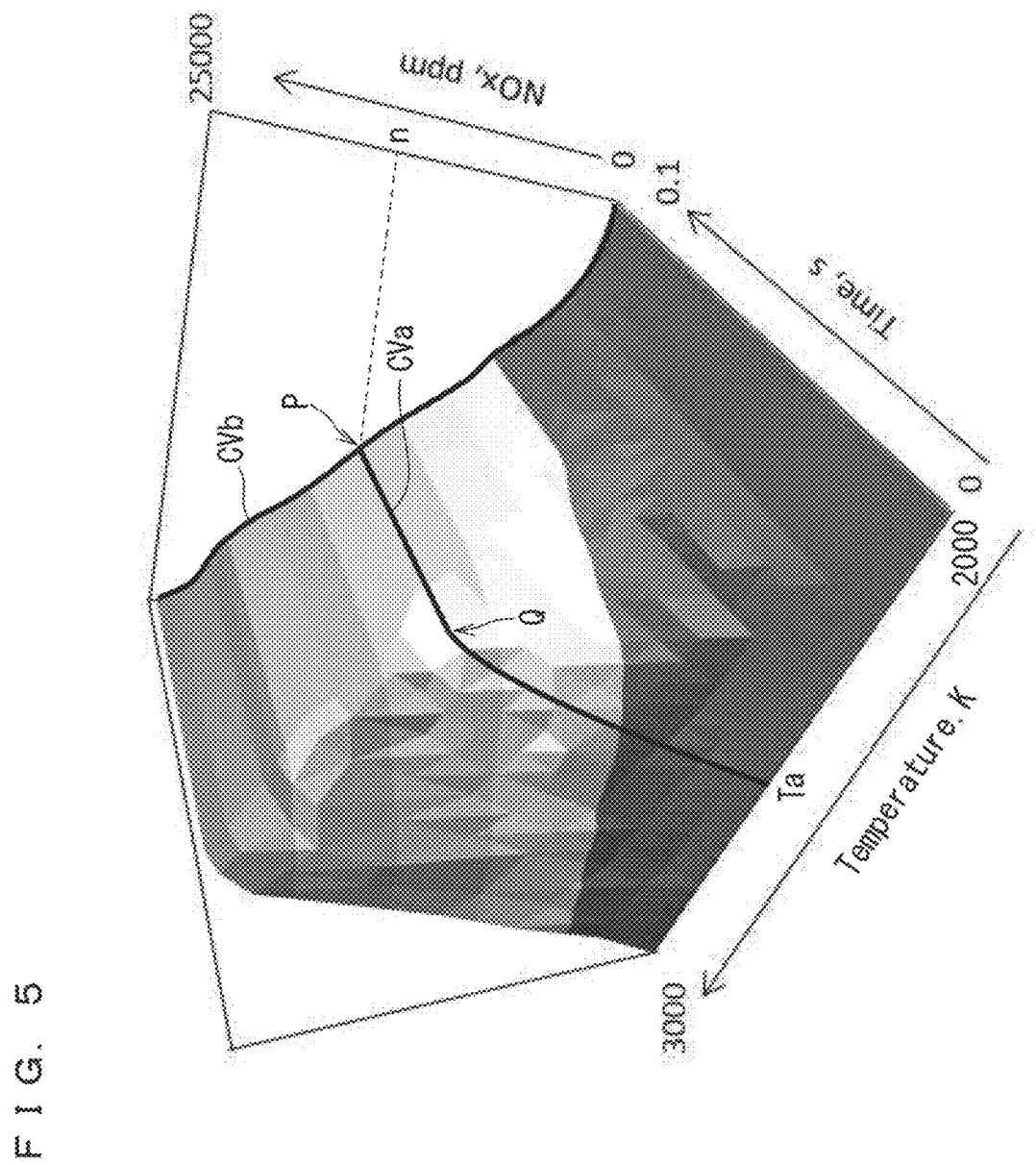
FIG. 5 is a graph illustrating a chronological change in a relationship between the NOx concentration of exhaust gas EG from an engine main body 100 and the temperature in the engine from the start of combustion.
Figure 6A:
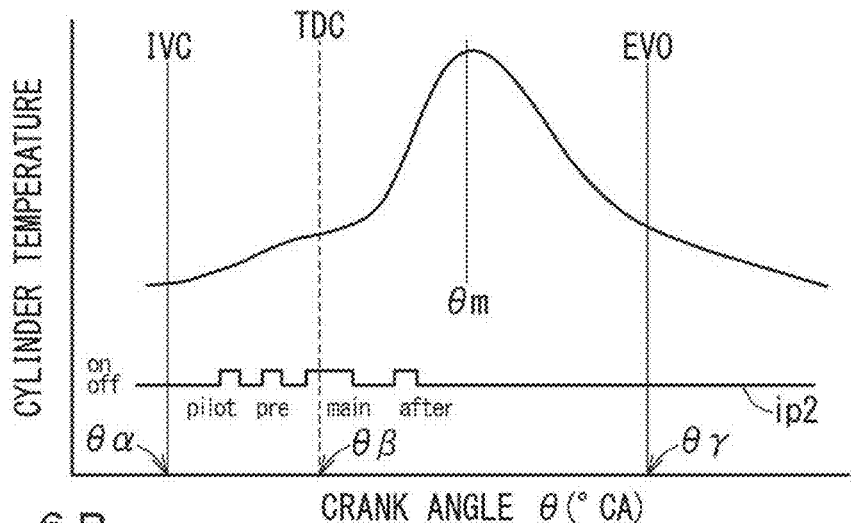
FIGS. 6A, 6B, and 6C are graphs illustrating crank angle dependency of a cylinder temperature, a cylinder pressure, and a heat generation rate in the engine main body 100 in the case of diffusion combustion.
Figure 6B:
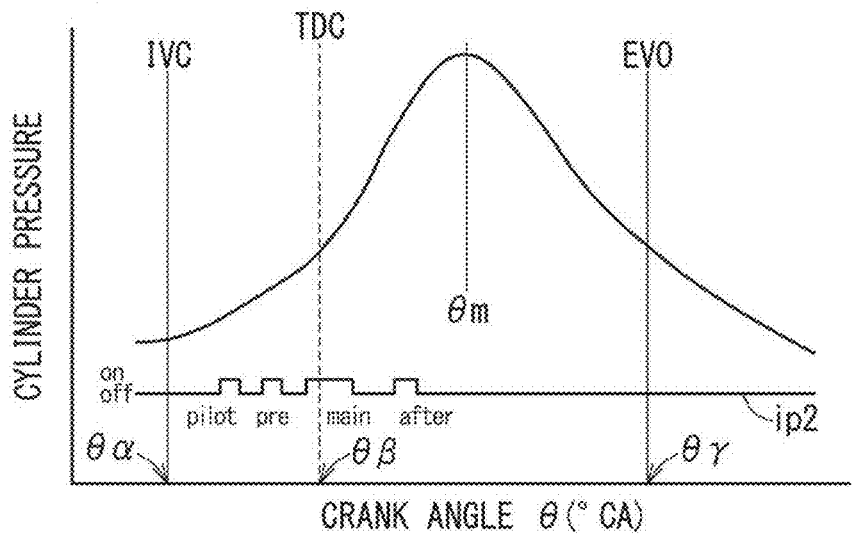
Figure 6C:
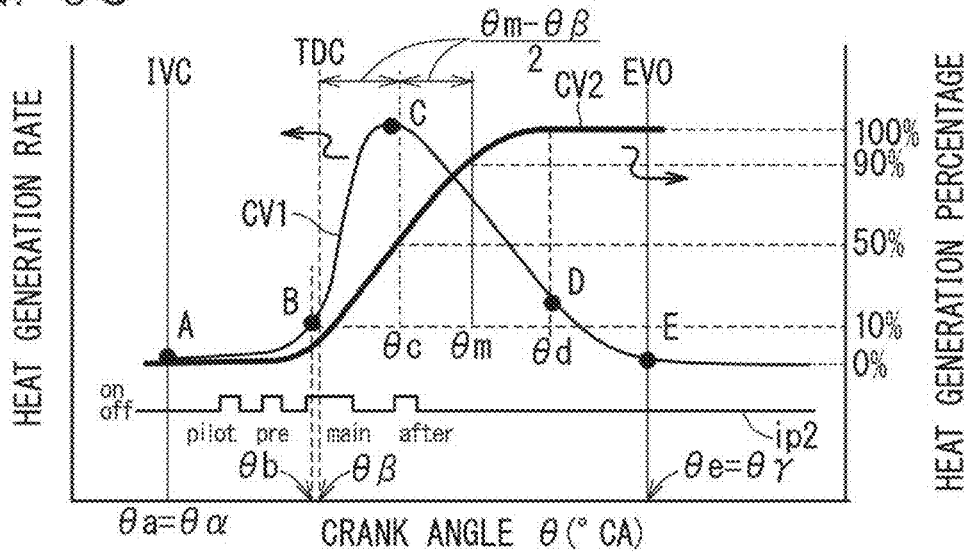

Next, the contents of the equal-NOx combustion control of the engine system 1000 performed under the control of the ECU 200 in the present embodiment will be described more specifically. FIG. 3 is a flowchart illustrating specific processing procedure of the equal-NOx combustion control performed in the present embodiment. FIG. 4 is a flowchart illustrating a procedure of a combustion state calculation performed in the equal-NOx combustion control. Furthermore, FIG. 5 is a graph illustrating a chronological change of the NOx concentration in a case that combustion starts in the engine main body 100 under a certain temperature (flame temperature) and still illustrating a chronological change in a relationship (NOx generation characteristic) between the NOx concentration in the exhaust gas EG from the engine main body 100 and flame temperatures from the start of combustion. In FIG. 5, a curve CVa indicates a chronological change of the NOx concentration when the flame temperature is Ta. Further, FIGS. 6A, 6B, and 6C are graphs illustrating crank angle dependency of the cylinder temperature, the cylinder pressure, and the heat generation rate in the engine main body 100 in the case of diffusion combustion.

In the equal-NOx combustion control, the NOx amount (NOx concentration) in the exhaust gas EG from the engine main body 100 is monitored when the vehicle equipped with the engine system 1000 is in the operating state. Such monitoring is performed by detecting the NOx in the exhaust gas EG at predetermined intervals by the NOx sensor NS1 provided near the upstream side of the LNT 13 (step S1).

In the ECU 200, the amount of NOx detected by the NOx sensor NS1 is compared with the reference value described in a reference NOx emission amount map preliminarily held in the ECU 200 (step S2). The reference NOx emission amount map is data obtained by mapping the reference value of the amount of NO discharged from the engine main body 100 in the vehicle driving state with respect to the engine rotation speed (unit: rpm) and the torque (unit: N·m). In other words, it can be said that the ECU 200 virtually constitutes determination means for determining whether or not the NOx amount in the exhaust gas falls within a predetermined reference range.

As long as the difference value between the detected NOx amount and the reference value described in the reference NOx emission amount map falls within the predetermined reference range (YES in step S2), such monitoring is only continued.

On the other hand, when the NOx amount detected by the NOx sensor NS1 is out of the reference range (NO in step S2), in the ECU 200, processing called a combustion state calculation, for estimating the combustion state in the engine main body 100, more specifically, the crank angle dependence of the heat generation (that is, the heat generation rate profile), is executed (step S3). Therefore, it can be said that the ECU 200 also virtually constitutes heat-generation-rate-profile estimation means for estimating the heat generation rate profile in the engine.

Briefly, the combustion state calculation is processing for estimating the heat generation rate profile as illustrated in FIG. 6C using the output of the NOx sensor NS1 and so forth, by utilizing the relation that, when the cylinder temperature becomes maximum (maximum flame temperature) at the crank angle $\theta=\theta m$ (° CA) where a certain fuel injection pulse ip2 is given, as illustrated in FIG. 6A, the cylinder pressure also becomes maximum at the crank angle $\theta=\theta m$ (° CA) as illustrated in FIG. 6B. It should be noted that, in FIG. 6A, FIG. 6B, and FIG. 6C, the crank angles of the intake valve closing timing IVC, the top dead center TDC of the piston, and the exhaust valve opening timing EVO are defined as $\theta\alpha$, $\theta\beta$, and $\theta\gamma$, respectively. These are known values determined according to the driving conditions of the vehicle.

In addition, FIG. 6C illustrates not only the estimated heat generation rate profile CV1 but also the heat generation percentage curve CV2 corresponding to the cumulative frequency distribution thereof. Here, the points A to E (respective crank angles $\theta a$ to $\theta e$) different from each other in the crank angle marked in the heat generation rate profile CV1 are respectively characterized as follows.

Point A: a point before the heat generation, in FIG. 6C, the point A is represented by the intake valve closing timing IVC, that is, $\theta a=\theta\alpha$;

Point B: a point estimated to be a 10% heat generation point (estimated 10% heat generation point);

Point C: a point estimated to be the maximum heat generation point (estimated maximum heat generation point);

Point D: a point estimated to end combustion (estimated combustion end point); and Point E: a point after the heat generation, in FIG. 6C, the point E is represented by the exhaust valve opening timing EVO, that is, $\theta e=\theta\gamma$.

In the present embodiment, the crank angle at the point B, which is the estimated 10% heat generation point, is regarded as the ignition timing in the engine main body 100.

First, based on the output from the intake pressure sensor 24, the cylinder pressure at the point A ($\theta=\theta a=\theta\alpha$) which is also the intake valve closing timing IVC is acquired (step S101).

Subsequently, by applying the output value from the NOx sensor NS1 to the pre-specified NOx generation characteristic illustrated in FIG. 5, the flame temperature (combustion temperature) and the time to give thereof (that is, the crank angle $\theta m$) are obtained (Step S102).

The NOx generation characteristic illustrated in FIG. 5 does vary according to the elapsed time t immediately after the start of combustion, but it becomes substantially constant after approximately 0.1 sec. has elapsed. For example, the functional relationship indicated by the NO concentration-temperature curve CVb at the point of 0.1 sec. elapsed illustrated in FIG. 5 is to be established thereafter. NOx in the exhaust gas EG to be detected by the NOx sensor NS1 reaches the arrangement position of the NOx sensor NS1 after some time (at least 0.1 sec. or more) has elapsed from the generation, therefore, as long as the combustion state in the engine main body 100 is held substantially constant, the flame temperature can be specified by using the NO concentration-temperature curve CVb.

In addition, from FIG. 5, the time at which the NOx concentration at the flame temperature is saturated after the start of combustion can be specified as the time at which the generation of NOx is completed. The time at which generation of NOx is completed corresponds $\theta=\theta m$ in FIGS. 6A, 6B, and 6C. For example, if the flame temperature is Ta and the NOx concentration is n, corresponding to the point P on the NO concentration-temperature curve CVb, the time at the point Q where the NOx concentration is saturated on the curve CVa gives $\theta=\theta m$.

It is known that $\theta=\theta m$ substantially coincides with the 90% heat generation point in the heat generation percentage curve CV2. Therefore, by specifying $\theta=\theta m$, the estimated 90% heat generation point is specified. Further, it is also known that the central crank angle between the crank angle $\theta m$ giving the 90% heat generation point and the crank angle $\theta\beta$ of the top dead center TDC is equivalent to the crank angle $\theta c$ of the point C (estimated maximum heat release rate point). Therefore, based on these relationships, the crank angle $\theta c$ at the estimated maximum heat generation rate point (point C) is derived (step S103).

The maximum heat generation rate point approximately coincides with the 50% heat generation point, therefore, it can be said that the crank angle $\theta c$ at point C gives the crank angle at the estimated 50% heat generation point.

Then, by linear extrapolation from the crank angle $\theta m$ at the 90% heat generation point and the crank angle $\theta c$ at the 50% heat generation point, the crank angle $\theta b$ at point B estimated to be the 10% heat generation point can also be derived (step S104). As a result, the ignition timing is estimated.

Subsequently, on the basis of the output from the exhaust pressure sensor 30, the cylinder pressure at point E ($\theta=\theta e=\theta\gamma$) which is also the exhaust valve opening timing EVO is acquired (step S105).

Finally, based on these series of processes, the heat generation rate profile, that is, the heat generation history can be estimated in the case where the NOx amount detected by the NOx sensor NS1 is out of the reference range (step S106).

Briefly, the crank angles $\theta b$, $\theta c$, $\theta m$ of the 10% heat generation point, the 50% heat generation point, and the 90% heat generation point are specified in the heat generation percentage curve CV2, therefore, the function that gives the heat generation percentage curve CV2 can be derived. And, as a profile matching the obtained heat generation percentage curve CV2, a function giving the heat generation rate profile CV1 is derived with the heat generation rate at the point C as the peak value (maximum heat generation rate). An appropriate simulation method may be applied to the specific calculation for such derivation. It has been confirmed by the inventors of the present invention that the heat generation rate profile CV1 derived in such a manner substantially and favorably coincides with the actual profile.

After the combustion state calculation is performed in the above manner and the heat generation profile is estimated, subsequently, in the ECU 200, a value of the index characterizing the heat generation profile is compared with a value of the index in the ideal heat generation profile determined from the driving condition of the vehicle, and, based on the comparison result, the combustion condition in the engine main body 100 is controlled. This is one mode of the control operation of the ECU 200 as the control means of the engine system 1000, which is the original function thereof.

Specifically, first, the estimated ignition timing (crank angle θb at point B) is compared with the ideal ignition timing specified from the driving conditions of the vehicle (step S4).

In the case that the difference value between the estimated ignition timing and the ideal ignition timing exceeds a predetermined reference range (NO in step S4), it is determined whether the specified ignition timing is advanced (excessively advanced) or retarded (excessively retarded) with respect to the ideal ignition timing (step S5). When advancing (excessively advanced), the operating condition is changed (step S6a) so that the injection timing in the fuel injection pulse ip2 can be retarded depending on the magnitude of excessiveness. When retarded (excessively retarded), the operating condition is changed (step S6b) so that the injection timing in the fuel injection pulse ip2 can be advancing depending on the magnitude of retardation.

Meanwhile, in the case that the difference value between the estimated ignition timing and the ideal ignition timing falls within the predetermined reference range (YES in step S4), the maximum cylinder pressure estimated based on the estimated heat generation rate profile CV1 is either excessive or insufficient compared to the ideal maximum cylinder pressure specified from the driving condition of the vehicle (step S7). In either case, the difference value therebetween is out of the reference range.

When the maximum cylinder pressure is excessive, the boost pressure in the VN turbo 11 is lowered or the opening of the valve VLV1 and/or VLV2 is adjusted so that the recirculation amount (EGR amount) in the high pressure exhaust circulation device EGR1 and/or the low pressure exhaust circulation device EGR2 can be increased (step S8a). When the maximum cylinder pressure is insufficient, the boost pressure in the VN turbo 11 is raised or the opening of the valve VLV1 and/or VLV2 is adjusted so that the recirculation amount (EGR amount) in the high pressure exhaust circulation device EGR1 and/or the low pressure exhaust circulation device EGR2 can be reduced (step S8b).

After any of steps S6a, S6b, S8a, and S8b is performed, the process returns to step S1 again to monitor NOx in the exhaust gas EG, and the comparison in step S2 is performed. As a result, if the NOx amount (NOx concentration) in the exhaust gas EG is still outside the reference range, the processing from step S3 on down is repeated. For example, the following may be the exemplified case, when the driving conditions of the vehicle are changed while the above procedure is being executed.

By executing the above procedure, the combustion condition is controlled such that the NOx amount (NOx concentration) in the exhaust gas EG is maintained at a value commensurate with the combustion condition at that time point. This is the equal-NOx combustion control in the present embodiment.

As described above, according to the equal-NOx combustion control according to the present embodiment, the combustion control of the engine can be suitably performed without providing the cylinder pressure sensor. It should be noted that, although the NOx concentration detected by the NOx sensor has a larger time constant than the output value of the cylinder pressure sensor, the controllability in the equal-NOx combustion control according to the present embodiment is substantially equivalent to the controllability in the combustion control using the cylinder pressure sensor, when taking into consideration occurring of data thinning in the combustion control using the cylinder pressure sensor, delaying in control of intake and EGR system, and delaying in gas flow, and the like. As for constantly performing the combustion control every moment, the correction of the fuel injection timing using the cylinder pressure sensor is the quickest, however, the equal-NOx combustion control according to the present embodiment is supposed to perform correction when a deviation from an ideal combustion mode is detected at regular intervals, therefore, the value of the time constant of the output from the NOx sensor is not a particular disadvantage.

Also, the NOx sensor essential for the equal-NOx combustion control according to the present embodiment is only the NOx sensor provided near the upstream side of the LNT 13, to which a NOx sensor provided for other purposes can be diverted, therefore, it is advantageous in terms of cost as compared with the case where an expensive cylinder pressure sensor is used.

Moreover, there is no influence of steps on the road surface at the time of control, combustion control with high robustness against physical disturbance is executed as compared with the case where the cylinder pressure sensor that may be affected by the above factor is used.

<Configuration Example of the NOx Sensor>

Figure 7:
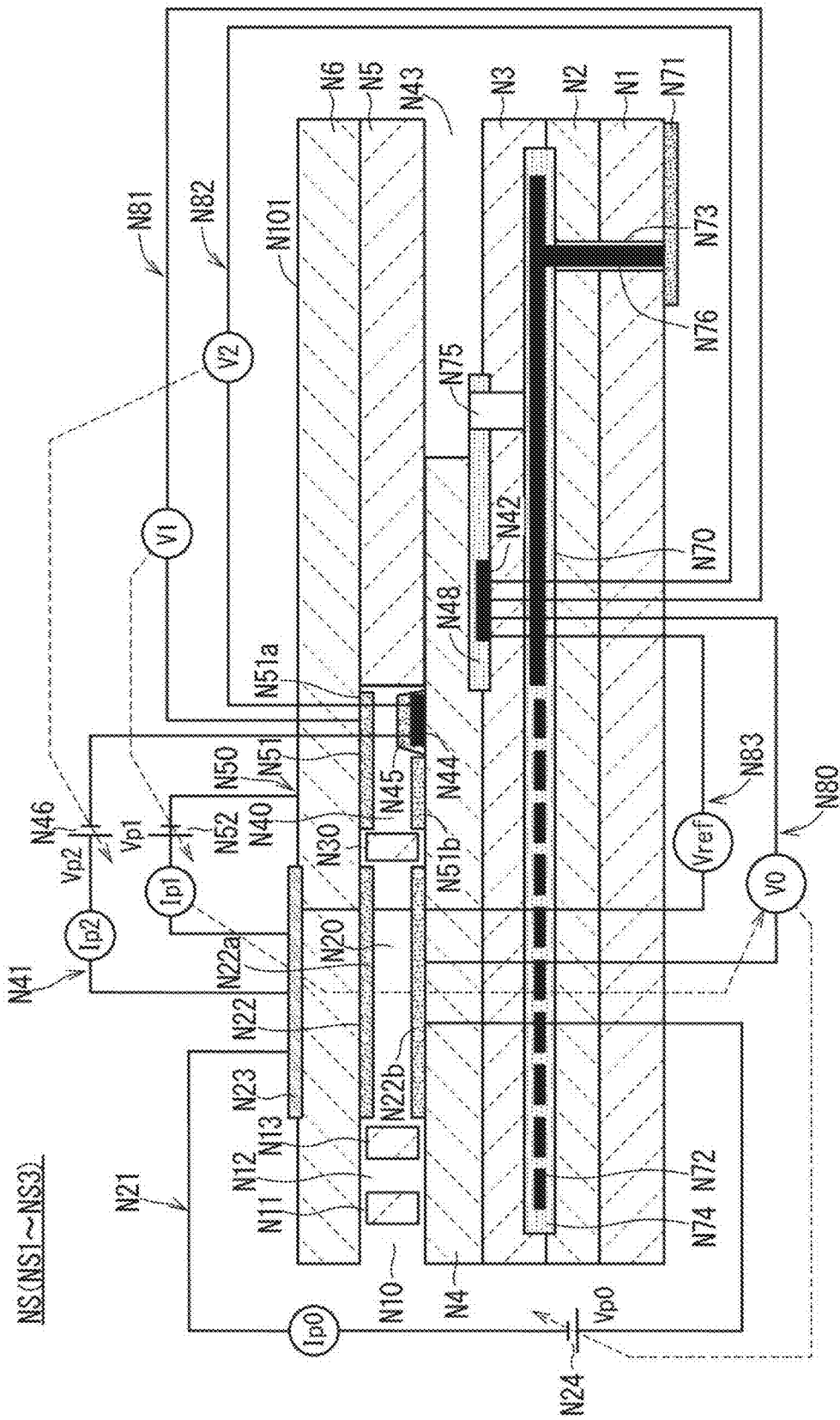
FIG. 7 is a schematic cross-sectional view illustrating a configuration example of a NOx sensor NS.

FIG. 7 is a schematic cross-sectional view illustrating a configuration example of the NOx sensor NS used in the engine system 1000. Hereinafter, regarding the configuration of the NOx sensor NS, a sensor element N101 which is a main component thereof will be mainly described. However, the configuration of the NOx sensor NS used in the engine system 1000 is not limited to that illustrated in FIG. 7.

The sensor element N101, which is the main component of the NOx sensor NS, has a structure including a first substrate layer N1, an second substrate layer N2, a third substrate layer N3, a first solid electrolyte layer N4, a spacer layer N5, and a second solid electrolyte layer N6, each of which is formed of an oxygen ion conductive solid electrolyte layer such as zirconia ($ZrO_2$), and the above layers are laminated in this order from the lower side in the drawing. In addition, the solid electrolyte forming the six layers is dense and gas-tight. Such a sensor element N101 is produced, for example, by subjecting a ceramic green sheet corresponding to each layer to predetermined processing and printing of a circuit pattern, laminating thereof, and then burning to integrate thereof.

Between the lower surface of the second solid electrolyte layer N6 and the upper surface of the first solid electrolyte layer N4, which are one end portion of the sensor element N101, a gas introduction port N10, a first diffusion control part N11, a buffer space N12, a second diffusion control part N13, a first internal space N20, a third diffusion control part N30, and a second internal space N40 are formed adjacent to each other in such a manner as to communicate in this order.

The gas introduction port N10, the buffer space N12, the first internal space N20, and the second internal space N40 are provided in such a manner that the spacer layer N5 is hollowed out, and are an internal space in the sensor element N101 in which, the upper part thereof is defined by the lower surface of the second solid electrolyte layer N6, the lower part thereof is defined by the upper surface of the first electrolyte layer N4, and a side part thereof is defined by the side surface of the spacer layer N5.

The first diffusion control part N11, the second diffusion control part N13, and the third diffusion control part N30 are all provided as two laterally long slits (the opening has a longitudinal direction in a direction perpendicular to the drawing). The portion from the gas introduction port N10 to the second internal space N40 is also referred to as a gas flow portion.

At a position farther from the end side than the gas flow portion, a reference gas introduction space N43 is provided, the position of the reference gas introduction space N43 is defined between the upper surface of the third substrate layer N3 and the lower surface of the spacer layer N5, and the side part thereof is defined by the side surface of the first solid electrolyte layer N4. For example, atmospheric air is introduced into the reference gas introduction space N43 as a reference gas for measuring the NOx concentration.

An atmosphere introduction layer N48 is a layer made of porous alumina and a reference gas is introduced into the atmospheric introduction layer N48 through the reference gas introduction space N43. Further, the atmospheric air introduction layer N48 is formed such that a reference electrode N42 is covered.

The reference electrode N42 is an electrode formed in a manner to be interposed between the upper surface of the third substrate layer N3 and the first solid electrolyte layer N4. As described above, the atmospheric air introduction layer N48 reaching the reference gas introduction space N43, is provided in the surroundings of the reference electrode N42. In addition, as described later, by using the reference electrode N42, measurement of the oxygen concentration (oxygen partial pressure) in the first internal space N20 and the second internal space N40 can be performed.

In the gas flow portion, the gas introduction port N10 is a portion opened to the external space, and a measurement gas is taken into the sensor element N101 from the external space through the gas introduction port N10.

The first diffusion control part N11 is a part that imparts a predetermined diffusion resistance to the measurement gas taken from the gas introduction port N10.

The buffer space N12 is a space provided to introduce the measurement gas introduced from the first diffusion control part N11 to the second diffusion control part N13.

The second diffusion control part N13 is a part that imparts a predetermined diffusion resistance to the measurement gas introduced from the buffer space N12 into the first internal space N20.

When the measurement gas is introduced from the outside of the sensor element N101 into the first internal space N20, the measurement gas rapidly taken into the sensor element N101 from the gas introduction port N10 by the pressure fluctuation of the measurement gas in the external space (pulsation of the exhaust pressure in the case where the measurement gas is the exhaust gas of the automobile) is not directly introduced into the first internal space N20, but is introduced into the first internal space N20 after the concentration variation of the measurement gas is canceled through the first diffusion control part N11, the buffer space N12, and the second diffusion control part N13. As a result, the concentration fluctuation of the measurement gas introduced into the first internal space N20 is mostly negligible.

The first internal space N20 is provided as a space for adjusting the oxygen partial pressure in the measurement gas introduced through the second diffusion control part N13. The oxygen partial pressure is adjusted by the operation of a main pump cell N21.

The main pump cell N21 is an electrochemical pump cell constituted of an inner pump electrode N22 having a ceiling electrode portion N22a provided on substantially the entire lower surface of the second solid electrolyte layer N6 facing the first internal space N20, an outer pump electrode N23 provided in a manner of being exposed to an external space in a region corresponding to the ceiling electrode portion N22a, and a second solid electrolyte layer N6 interposed between the electrodes.

The inner pump electrode N22 is formed such that the inner pump electrode N22 extends over the upper and lower solid electrolyte layers (the second solid electrolyte layer N6 and the first solid electrolyte layer N4) that define the first internal space N20 and the spacer layer N5 serving as a sidewall. Specifically, the ceiling electrode portion N22a is formed on the lower surface of the second solid electrolyte layer N6 which serves as a ceiling surface of the first internal space N20, and the electrode portion N22b is formed on the upper surface of the first solid electrolyte layer N4 which serves as a bottom surface thereof. And, a side electrode portion (not shown) is formed on a side wall surface (inner surface) of the spacer layer N5 constituting both side wall portions of the first internal space N20 so as to connect the ceiling electrode portion N22a and the bottom electrode portion N22b, and accordingly, the inner pump electrode N22 is disposed in a structure having a tunnel form at the disposition portion of the side electrode portion.

The inner pump electrode N22 and the outer pump electrode N23 are formed as a porous cermet electrode (for example, a cermet electrode of Pt containing 1% Au and zirconia). In addition, the inner pump electrode N22 in contact with the measurement gas is formed using a material which is reduced in the reducing ability for the NOx component in the measurement gas.

In the main pump cell N21, a desired pump voltage Vp0 is applied between the inner pump electrode N22 and the outer pump electrode N23 to flow a pump current Ip0 in the positive direction or the negative direction between the inner pump electrode N22 and the outer pump electrode N23, thereby oxygen in the first internal space N20 can be pumped out to the external space or oxygen in the external space can be pumped into the first internal space N20.

Also, in order to detect the oxygen concentration (oxygen partial pressure) in the atmosphere in the first internal space N20, the inner pump electrode N22, the second solid electrolyte layer N6, the spacer layer N5, the first solid electrolyte layer N4, the third substrate layer N3, and the reference electrode N42 constitute an electrochemical sensor cell, that is, a main pump-control oxygen-partial-pressure detection sensor cell N80.

By measuring the electromotive force V0 in the main pump-control oxygen-partial-pressure detection sensor cell N80, the oxygen concentration (oxygen partial pressure) in the first internal space N20 can be determined. Further, the pump current Ip0 is controlled by feedback-controlling Vp0 such that the electromotive force V0 is constant. Accordingly, the oxygen concentration in the first internal space N20 can be maintained at a predetermined constant value.

The third diffusion control part N30 applies a predetermined diffusion resistance to the measurement gas of which oxygen concentration (oxygen partial pressure) is controlled by the operation of the main pump cell N21 in the first internal space N20 and leads the resultant gas to the second internal space N40.

The second internal space N40 is provided as a space for processing the measurement of the nitrogen oxide (NOx) concentration in the measurement gas introduced through the third diffusion control part N30. Measurement of the NOx concentration is mainly performed in the second internal space N40 of which oxygen concentration is adjusted by an auxiliary pump cell N50, and then, further, operated by a measurement pump cell N41.

In the second internal space N40, the measurement gas introduced through the third diffusion control section N30, after the oxygen concentration (oxygen partial pressure) is adjusted in the first internal space N20 in advance, is further subjected to adjustment of the oxygen partial pressure by the auxiliary pump cell N50. As a result, the oxygen concentration in the second internal space N40 can be kept constant with high accuracy, so that the NOx concentration can be measured with high accuracy in the NOx sensor NS.

The auxiliary pump cell N50 is an electrochemical pump cell constituted of an auxiliary pump electrode N51 having a ceiling electrode portion N51a provided substantially over the entire lower surface of the second solid electrolyte layer N6 facing the second internal space N40, an outer pump electrode N23, (it is not limited to the outer pump electrode N23 and it suffices if it is the sensor element N101 and any appropriate outer electrode), and the second solid electrolyte layer N6.

The auxiliary pump electrode N51 is disposed in the second internal space N40 in a tunnel form similar to the inner pump electrode N22 provided in the first internal space N20. That is, the ceiling electrode portion N51a is formed on the second solid electrolyte layer N6 which serves as a ceiling surface of the second internal space N40, and the electrode portion N51b is formed on the first solid electrolyte layer N4 which serves as a bottom surface of the second internal space N40. And, each side electrode portion (not shown) is formed on the both wall surfaces of the spacer layer N5 which serves as side walls of the second inner space N40 so as to connect the ceiling electrode portion N51a and the bottom electrode portion N51b, and accordingly, the auxiliary pump electrode N51 is made in a tunnel form.

Similarly to the inner pump electrode N22, the auxiliary pump electrode N51 is also formed using a material which is reduced in the reducing ability for the NOx component in the measurement gas.

In auxiliary pump cell N50, a desired pump voltage Vp1 is applied between the auxiliary pump electrode N51 and the outer pump electrode N23, thereby oxygen in the second internal space N40 can be pumped out to the external space or oxygen in the external space can be pumped into the second internal space N40.

Also, in order to control the oxygen partial pressure in the atmosphere in the second internal space N40, the auxiliary pump electrode N51, the reference electrode N42, the second solid electrolyte layer N6, the spacer layer N5, the first solid electrolyte layer N4, and the third substrate layer N3, constitute an electrochemical sensor cell, that is, an auxiliary pump-control oxygen-partial-pressure detection sensor cell N81.

With a variable power source N52 of which voltage is controlled based on the electromotive force V1 detected in this auxiliary pump-control oxygen-partial-pressure detection sensor cell N81, the auxiliary pump cell N50 performs pumping. Therefore, the oxygen partial pressure in the atmosphere in the second internal space N40 is controlled to a low partial pressure which does not affect measurement of NOx.

In addition, the pump current Ip1 is used together with the above to control the electromotive force of the main pump-control oxygen-partial-pressure detection sensor cell N80. Specifically, the pump current Ip1 is input to the main pump-control oxygen-partial-pressure detection sensor cell N80 as a control signal, and the electromotive force V0 thereof is controlled so that the gradient of the oxygen partial pressure of the measurement gas to be introduced from the diffusion control part N30 into the second internal space N40 is controlled to be always constant. When used as a NOx sensor, the oxygen concentration in the second internal space N40 is maintained at a constant value of about 0.001 ppm by the operation of the main pump cell N21 and the auxiliary pump cell N50.

The measurement pump cell N41 measures the NOx concentration in the measurement gas in the second internal space N40. The measurement pump cell N41 is an electrochemical pump cell constituted of a measurement electrode N44 provided at a position on the upper surface of the first solid electrolyte layer N4 facing the second internal space N40 and spaced apart from the third diffusion control part N30, the outer pumping electrode N23, the second solid electrolyte layer N6, the spacer layer N5, and the first solid electrolyte layer N4.

The measurement electrode N44 is a porous cermet electrode. The measurement electrode N44 also functions as a NOx a reducing catalyst for reducing NOx presenting in the atmosphere in the second internal space N40. Further, the measurement electrode N44 is covered with a fourth diffusion control part N45.

The fourth diffusion control part N45 is a film composed of a porous body containing alumina ($Al_2O_3$) as a main component. The fourth diffusion control part N45 serves to limit the NOx amount flowing into the measurement electrode N44 and also functions as a protective film of the measurement electrode N44.

In the measurement pump cell N41, oxygen generated by decomposition of nitrogen oxides in the atmosphere around the measurement electrode N44 due to the catalytic activity of the measurement electrode N44 is pumped out, and the generated amount can be detected as a pump current (also referred to as NOx current) Ip2.

In order to detect oxygen partial pressure around the measurement electrode N44, the second solid electrolyte layer N6, the spacer layer N5, the first solid electrolyte layer N4, the third substrate layer N3, the measurement electrode N44, and the reference electrode N42 constitute an electrochemical sensor cell, that is, a measurement pump-control oxygen-partial-pressure detection sensor cell N82. The variable power source N46 is controlled based on the electromotive force V2 detected by the measurement pump-control oxygen-partial-pressure detecting sensor cell N82.

The measurement gas introduced into the second internal space N40 reaches the measurement electrode N44 through the fourth diffusion control part N45 under the condition that the oxygen partial pressure is controlled. The nitrogen oxides in the measurement gas around the measurement electrode N44 are reduced to generate oxygen ($2NO \rightarrow N_2 + O_2$). The generated oxygen is pumped by the measurement pump cell N41. At that time, the voltage Vp2 of a variable power source N46 is controlled so that the electromotive force V2 detected by the measurement pump-control oxygen-partial-pressure detection sensor cell N82 becomes constant. The amount of oxygen generating around the measurement electrode N44 is proportional to the concentration of nitrogen oxides in the measurement gas, therefore, the nitrogen oxide concentration in the measurement gas is calculated using the pump current Ip2 in the measurement pump cell N41.

Oxygen partial pressure detection means is constituted as an electrochemical sensor cell by combining the measurement electrode N44, the first solid electrolyte layer N4, the third substrate layer N3, and the reference electrode N42, thereby, a electromotive force corresponding to a difference between the amount of oxygen generated by the reduction of the NOx component in the atmosphere around the measurement electrode N44 and the amount of oxygen contained in the reference atmosphere can be detected, and this makes it possible to obtain the concentration of NOx component in the measurement gas.

Furthermore, the second solid electrolyte layer N6, the spacer layer N5, the first solid electrolyte layer N4, the third substrate layer N3, the outer pump electrode N23, and the reference electrode N42 constitute an electrochemical sensor cell N83, and based on the electromotive force $V_{ref}$ obtained by the sensor cell N83, the oxygen concentration (oxygen partial pressure) in the measurement gas outside the sensor can be specified. Specifically, the NOx sensor NS also has a function as an oxygen sensor.

In the NOx sensor NS having such a configuration, by operating the main pump cell N21 and the auxiliary pump cell N50, the measurement gas of which oxygen partial pressure is always kept at a constant low value (a value substantially not affecting the measurement of NOx) is supplied to the measurement pump cell N41. Therefore, based on the pump current Ip2 flowing by pumping out oxygen generated by the reduction of NOx by the measurement pump cell N41 substantially in proportion to the concentration of NOx in the measurement gas, the concentration of NOx in the measurement gas is grasped More specifically, for each sensor element N101, a functional relationship (sensitivity characteristic) between the pump current Ip2 and the NOx concentration is specified beforehand prior to use. In actual detection of NOx, the value of Ip2 is continuously measured, and the NOx concentration corresponding to each measurement value is obtained based on the previously specified sensitivity characteristic.

In addition, in the sensor element N101, by measuring the electromotive force $V_{ref}$ generated between the outer pump electrode N23 and the reference electrode N42, the oxygen partial pressure outside the sensor element N101 can be grasped.

In addition, the sensor element N101 includes a heater part N70 adopted for temperature adjustment for heating and retaining warmth of the sensor element N101 in order to increase oxygen ion conductivity of the solid electrolyte. The heater part N70 includes a heater electrode N71, a heater N72, a through hole N73, a heater insulating layer N74, and a pressure release hole N75.

The heater electrode N71 is an electrode formed in a manner in contact with the lower surface of the first substrate layer N1. By connecting the heater electrode N71 to an external power supply, electric power can be supplied to the heater portion N70 from the outside.

The heater N72 is an electric resistor formed in a manner interposed between the second substrate layer N2 and the third substrate layer N3 from above and below. The heater N72 is connected to the heater electrode N71 via the through hole N73, and generates heat by being supplied with the electric power from the outside through the heater electrode N71, thereby heating and retaining warmth of the solid electrolyte forming the sensor element N101.

In addition, the heater N72 is embedded over the entire area from the first internal space N20 to the second internal space N40, so that the entire sensor element N101 can be adjusted to a temperature at which the solid electrolyte is activated.

The heater insulating layer N74 is an insulating layer formed on the upper and lower surfaces of the heater N72 by an insulator such as alumina. The heater insulating layer N74 is formed to obtain electrical insulation between the second substrate layer N2 and the heater N72 and electrical insulation between the third substrate layer N3 and the heater N72.

The pressure release hole N75 penetrates through the third substrate layer N3 and is provided so as to communicate with the reference gas introduction space N43. The pressure release hole N 75 is formed for alleviating an increase in internal pressure accompanying a temperature rise in the heater insulating layer N74.

While the invention has been shown and described in detail, the foregoing description is in all aspects illustrative and not restrictive. It is therefore understood that numerous modifications and variations can be devised without departing from the scope of the invention.

What is claimed is:

1. A combustion control method in an engine of a vehicle wherein an exhaust path for an exhaust gas discharged from said engine includes a catalyst and a NOx sensor provided on an upstream side of said catalyst, said method comprising the steps of:
    a) specifying a NOx concentration in said exhaust gas based on an output value from said NOx sensor and determining whether said NOx concentration falls within a predetermined reference range;
    b) estimating a heat generation rate profile indicating crank angle dependency of a heat generation rate in said engine when said NOx concentration is determined out of said reference range in said step a); and
    c) comparing a value of an index characterizing said heat generation rate profile estimated in said step b) with a value of an index in an ideal heat generation rate profile specified from a driving condition of the vehicle on which said engine is mounted and controlling a combustion condition in said engine based on a result thereof.

2. The combustion control method according to claim 1, wherein,
    in said step c), an estimated ignition timing and an ideal ignition timing are compared with each other, and the combustion condition in said engine is controlled based on a result thereof, said estimated ignition timing being estimated as an ignition timing in said engine based on said heat generation rate profile, and said ideal ignition timing being an ignition timing for said engine in the ideal heat generation rate profile specified from the driving condition of said vehicle.

3. The combustion control method according to claim 2, wherein,
    in said step c), an estimated maximum cylinder pressure and an ideal maximum cylinder pressure are compared with each other and the combustion condition in said engine is controlled based on a result thereof, said estimated maximum cylinder pressure being estimated as a maximum cylinder pressure in said engine based on said heat generation rate profile, and said ideal maximum cylinder pressure being a maximum cylinder pressure for said engine in the ideal heat generation rate profile specified from the driving condition of said engine.

4. The combustion control method according to claim 2, wherein,
    in said step b), each crank angle giving a 90% heat generation point, a 50% heat generation point, and a 10% heat generation point which are corresponding to the heat generation rate profile is estimated, and then said heat generation rate profile is estimated based on the obtained estimation results for said each crank angle, wherein each of the crank angles is estimated by specifying a flame temperature at NOx generation time, regarding said 90% heat generation point,
specifying as a central point between said 90% heat generation point and a top dead center of said engine, regarding said 50% heat generation point, and
linear extrapolation from said 90% heat generation point and said 50% heat generation point, regarding said 10% heat generation point.

5. The combustion control method according to claim 2, wherein,
in said step c), the combustion condition in said engine is controlled by
retarding a fuel injection pulse for defining fuel injection timing from a fuel injection element attached to said engine, in the case that said estimated ignition timing exceeds a predetermined reference range and is advanced with respect to said ideal ignition timing, and
advancing said fuel injection pulse, in the case that said estimated ignition timing exceeds the predetermined reference range and is retarded with respect to said ideal ignition timing.

6. The combustion control method according to claim 1, wherein,
in said step c), an estimated maximum cylinder pressure and an ideal maximum cylinder pressure are compared with each other and the combustion condition in said engine is controlled based on a result thereof, said estimated maximum cylinder pressure being estimated as a maximum cylinder pressure in said engine based on said heat generation rate profile, and said ideal maximum cylinder pressure being a maximum cylinder pressure for said engine in the ideal heat generation rate profile specified from the driving condition of said engine.

7. The combustion control method according to claim 6, wherein
said engine includes a turbocharger, and
in said step c), the combustion condition in said engine is controlled by,
lowering a boost pressure in said turbocharger in the case that said estimated maximum pressure is larger than said ideal maximum pressure and a difference value therebetween is out of a predetermined reference range, and
raising said boost pressure, in the case that said estimated maximum pressure is smaller than said ideal maximum pressure and a difference value therebetween is out of the predetermined reference.

8. The combustion control method according to claim 6, wherein
said engine includes an exhaust circulation element attached thereto,
in said engine, a portion of said exhaust gas is recirculated by said exhaust circulation element to be re-sucked, and
in said step c), the combustion condition in said engine is controlled by,
increasing a recirculation amount of said exhaust gas in said exhaust circulation element, in the case that said estimated maximum pressure is larger than said ideal maximum pressure and a difference value therebetween is out of a predetermined reference range, and
reducing said recirculation amount, in the case that said estimated maximum pressure is smaller than said ideal maximum pressure and a difference value therebetween is out of the predetermined reference.

9. The combustion control method according to claim 6, wherein,
in said step b), each crank angle giving a 90% heat generation point, a 50% heat generation point, and a 10% heat generation point which are corresponding to the heat generation rate profile is estimated, and then said heat generation rate profile is estimated based on the obtained estimation results for said each crank angle, wherein each of the crank angles is estimated by specifying a flame temperature at NOx generation time, regarding said 90% heat generation point,
specifying as a central point between said 90% heat generation point and a top dead center of said engine, regarding said 50% heat generation point, and
linear extrapolation from said 90% heat generation point and said 50% heat generation point, regarding said 10% heat generation point.

10. The combustion control method according to claim 1, wherein,
in said step b), each crank angle giving a 90% heat generation point, a 50% heat generation point, and a 10% heat generation point which are corresponding to the heat generation rate profile is estimated, and then said heat generation rate profile is estimated based on the obtained estimation results for said each crank angle, wherein each of the crank angles is estimated by specifying a flame temperature at NOx generation time, regarding said 90% heat generation point,
specifying as a central point between said 90% heat generation point and a top dead center of said engine, regarding said 50% heat generation point, and
linear extrapolation from said 90% heat generation point and said 50% heat generation point, regarding said 10% heat generation point.

11. An engine system for a vehicle including an engine and an exhaust path including a catalyst in the middle thereof wherein an exhaust gas from said engine is discharged outside through said exhaust path, the system comprising:
a NOx sensor provided on an upstream side of said catalyst in said exhaust path;
a determination element configured to determine whether a NOx concentration in said exhaust gas specified based on an output value from said NOx sensor falls within a predetermined reference range;
a heat-generation-rate-profile estimation element configured to estimate, a heat generation rate profile indicating crank angle dependency of a heat generation rate in said engine when said determination element determines that said NOx concentration is out of said reference range; and
a combustion control element configured to compare a value of an index characterizing said heat generation rate profile estimated by said heat-generation-rate-profile estimation element with a value of an index in an ideal heat generation rate profile specified from a driving condition of the vehicle on which said engine is mounted and control a combustion condition in said engine based on a result.

12. The engine system for a vehicle according to claim 11, wherein
said combustion control element is configured to compare an estimated ignition timing with an ideal ignition timing and control the combustion condition in said engine based on a result thereof, said estimated ignition timing being estimated as an ignition timing in said engine based on said heat generation rate profile, and said ideal ignition timing being an ignition timing for said engine in the ideal heat generation rate profile specified from the driving condition of said engine.

13. The engine system for a vehicle according to claim 12, wherein
said combustion control element is configured to control a combustion condition in said engine by, retarding a fuel injection pulse for defining fuel injection timing from a fuel injection element attached to said engine, in the case that said estimated ignition timing exceeds a predetermined reference range and is advanced with respect to said ideal ignition timing, and advancing said fuel injection pulse, in the case that said estimated ignition timing exceeds the predetermined reference range and is retarded with respect to said ideal ignition timing.

14. The engine system for a vehicle according to claim 12, wherein
said combustion control element is configured to compare an estimated maximum cylinder pressure with an ideal maximum cylinder pressure each other, and control the combustion condition in said engine based on a result thereof, said estimated maximum cylinder pressure being estimated as a maximum cylinder pressure in said engine based on said heat generation rate profile, and said ideal maximum cylinder pressure being a maximum cylinder pressure for said engine in the ideal heat generation rate profile specified from the driving condition of said engine.

15. The engine system for a vehicle according to claim 12, wherein,
said heat-generation-rate-profile estimation element is configured to estimate each crank angle giving a 90% heat generation point, a 50% heat generation point, and a 10% heat generation point which are corresponding to said heat generation rate profile, and then estimate said heat generation rate profile based on the obtained estimation results for said each crank angle, wherein each of the crank angles is estimated by
specifying a flame temperature at NOx generation time, regarding said 90% heat generation point,
specifying as a central point between said 90% heat generation point and a top dead center of said engine, regarding said 50% heat generation point, and
linear extrapolation from said 90% heat generation point and said 50% heat generation point, regarding said 10% heat generation point.

16. The engine system for a vehicle according to claim 11, wherein
said combustion control element is configured to compare an estimated maximum cylinder pressure with an ideal maximum cylinder pressure each other, and control the combustion condition in said engine based on a result thereof, said estimated maximum cylinder pressure being estimated as a maximum cylinder pressure in said engine based on said heat generation rate profile, and said ideal maximum cylinder pressure being a maximum cylinder pressure for said engine in the ideal heat generation rate profile specified from the driving condition of said engine.

17. The engine system for a vehicle according to claim 16, wherein
said engine includes a turbocharger, and said combustion control element is configured to control a combustion condition in said engine by
lowering a boost pressure in said turbocharger, in the case that said estimated maximum pressure is larger than said ideal maximum pressure and a difference value therebetween is out of a predetermined reference range, and
raising said boost pressure, in the case that said estimated maximum pressure is smaller than said ideal maximum pressure and a difference value therebetween is out of the predetermined reference.

18. The engine system for a vehicle according to claim 16, wherein
in said engine, a portion of said exhaust gas is recirculated by an exhaust circulation element attached thereto to be re-sucked, and
said combustion control element is configured to control a combustion condition in said engine by
increasing a recirculation amount of said exhaust gas in said exhaust circulation element, in the case that said estimated maximum pressure is larger than said ideal maximum pressure and a difference value therebetween is out of a predetermined reference range, and
reducing said recirculation amount, in the case that said estimated maximum pressure is smaller than said ideal maximum pressure and a difference value therebetween is out of the predetermined reference.

19. The engine system for a vehicle according to claim 16, wherein,
said heat-generation-rate-profile estimation element is configured to estimate each crank angle giving a 90% heat generation point, a 50% heat generation point, and a 10% heat generation point which are corresponding to said heat generation rate profile, and then estimate said heat generation rate profile based on the obtained estimation results for said each crank angle, wherein each of the crank angles is estimated by
specifying a flame temperature at NOx generation time, regarding said 90% heat generation point,
specifying as a central point between said 90% heat generation point and a top dead center of said engine, regarding said 50% heat generation point, and
linear extrapolation from said 90% heat generation point and said 50% heat generation point, regarding said 10% heat generation point.

20. The engine system for a vehicle according to claim 11, wherein
said heat-generation-rate-profile estimation element is configured to estimate each crank angle giving a 90% heat generation point, a 50% heat generation point, and a 10% heat generation point which are corresponding to said heat generation rate profile, and then estimate said heat generation rate profile based on the obtained estimation results for said each crank angle, wherein each of the crank angles is estimated by
specifying a flame temperature at NOx generation time, regarding said 90% heat generation point,
specifying as a central point between said 90% heat generation point and a top dead center of said engine, regarding said 50% heat generation point, and
linear extrapolation from said 90% heat generation point and said 50% heat generation point, regarding said 10% heat generation point.

* * * * *